Patented Nov. 22, 1927.

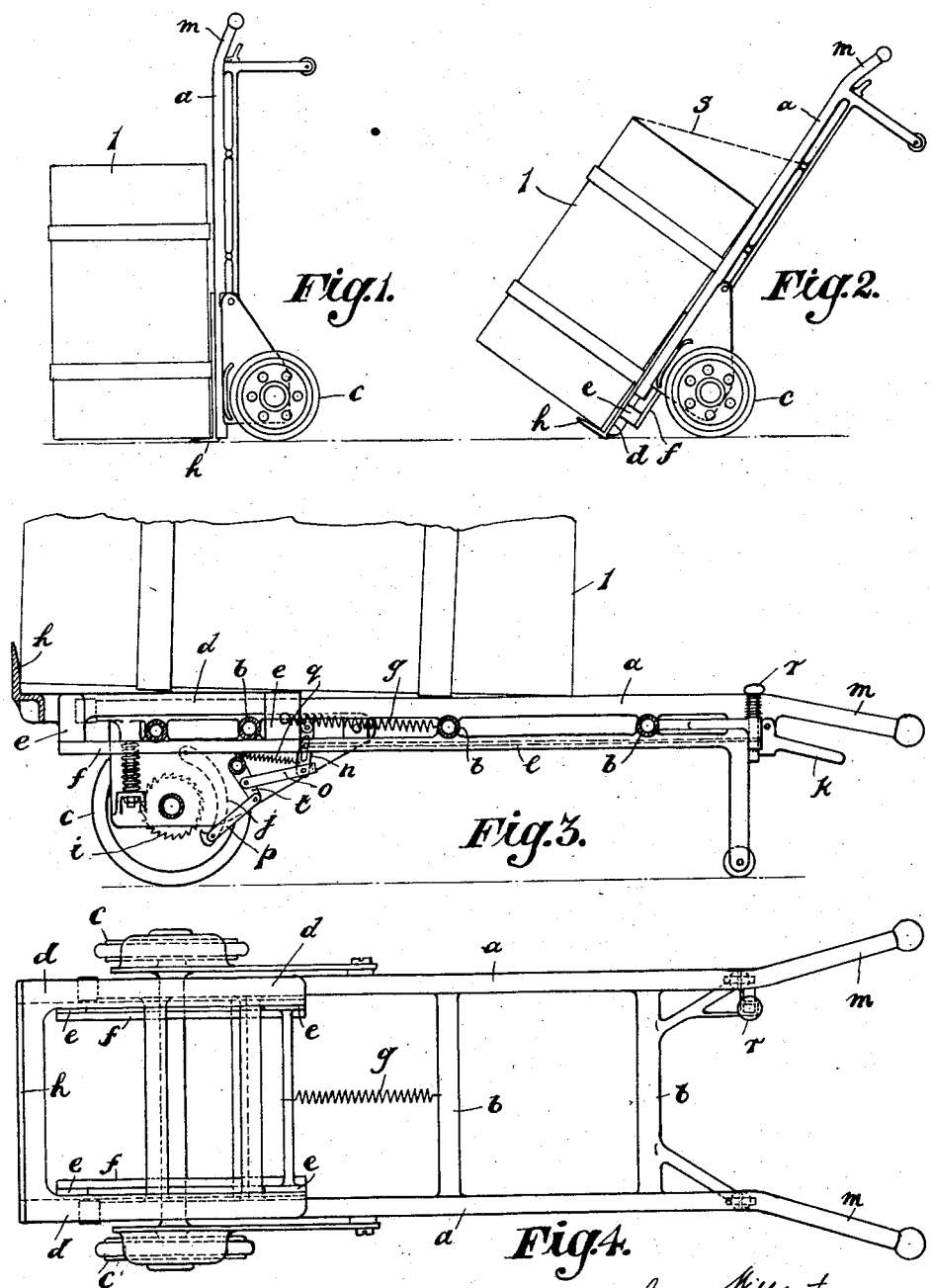

1,649,940

UNITED STATES PATENT OFFICE.

OLIVER JAMES WILLMOT, OF MALVERN, ENGLAND.

TRUCK, TROLLEY, VEHICLE, AND THE LIKE.

Application filed July 7, 1926, Serial No. 121,001, and in Great Britain June 12, 1925.

This invention relates to trucks, trolleys and similar vehicles whereby a load is lifted on to the body of the truck or the like by tilting the body and engaging a toe-piece or shoe on the depressed end thereof beneath or into the load which is then tilted over on to the tilted body. The object of the invention is to facilitate the tilting of the load on to the tilted truck body.

For this purpose, according to the invention, the toe-piece or shoe at the end of a truck, trolley or the like, instead of being directly connected to the wheeled body of the truck or the like is so mounted as to be permitted limited outward movement relatively to the body such as to allow the turning axis of the body of the truck or the like to recede from the toe-piece or shoe. The effect of this arrangement is that when the toe-piece has been inserted beneath or has otherwise engaged the load, on simultaneously depressing the end of the truck body remote from the toe-piece and withdrawing the body away from the load, the latter tends to become tilted over on to the truck body and, if necessary with slight assistance, can be so tilted over, without however the load as a whole having to be raised as is the case with trucks having the usual non-sliding arrangement of toe-piece.

To permit the sliding movement of the toe-piece, the latter is mounted on the end of a frame supported, guided and sliding longitudinally to a limited extent along the truck body.

A truck fitted according to the invention is illustrated by way of example in the accompanying drawing, in which:—

Figures 1 and 2 are side elevations showing the truck in the positions assumed immediately before and immediately after a load has been tilted on to the truck, Figure 3 is a sectional side elevation, on a larger scale, of the loaded truck in the longitudinal position, and Figure 4 is a plan view of the truck.

$a$ are the longitudinal side members of the truck body interconnected by transverse members $b$ and formed at one end with handles $m$. This truck body frame is as usual supported on wheels $c$, the axis of which is located near the end of the truck remote from the handles $m$.

Resting on the body frame $a$, $b$ is a rectangular frame $d$, which can slide longitudinally along the body frame to an extent limited by lug bars $e$ which extend downwards between and closely adjacent to the side members $a$, and which are interconnected longitudinally by bars $f$ which extend beneath the respective transverse members $b$. The bars $e$ and $f$ therefore retain and guide the sliding frame $d$ on the truck body $a$, $b$, the extent of the sliding movement permitted being limited by the abutment of the lug bars $e$ against the respective cross bars $b$ in both directions.

The sliding frame $d$ is drawn when unloaded by a spring $g$ towards the handle end of the truck body as far as permitted by the guide bars $e$, $f$.

The toe-piece or shoe $h$ of the truck is secured to the end of the sliding frame $d$ remote from the handle end of the truck, instead of as usual being mounted on the end of the truck body.

The result of this arrangement can be seen from the diagrammatic views Figs. 1 and 2, which show that in the course of tilting an engaged load 1, owing to the extensibility of the attachment of the toe-piece $h$ by virtue of its being on the sliding frame $d$ which slides to permit the toe-piece to remain on the floor or ground, the load can tilt without the edge about which it tilts rising from the floor or ground. This obviously renders the loading of the truck easier than the loading of an ordinary truck having a non-extensible toe-piece.

The wheels are in the truck illustrated locked against backward rotation by means such as a ratchet wheel $i$ fixed in relation to each wheel, with which a pivoted pawl $j$ is engaged. This pawl is in the form illustrated connected to the control lever $k$ by links, $l$, $n$, $o$, $t$, and $p$, and the pawl is normally held in engagement with the ratchet wheel by means of the spring $q$. A spring stop $r$ holds the control lever $k$ in position with the pawl out of engagement with the ratchet wheel. Any other means may however be utilized for locking the wheels $c$ against rotation in relation to the body of the vehicle. When the wheels $c$ are locked and the vehicle is moved from the position shown by Figure 1 to the position shown by Figure 2, such wheels roll on the ground and the turning axis of the vehicle is the point of contact of the wheels with the ground which axis gradually recedes from the toe-piece.

A chain s may connect the top of the load to the body to facilitate the tilting operation. By this invention one person can load a truck with a very heavy load which would with ordinary trucks require two or three persons.

When the load and truck have assumed the positions shown in Fig. 2 the truck can easily be tilted so that the toe-piece and load are clear of the ground and transported as usual, as the load then overhangs the wheels in both directions.

Although the invention has been described in connection with a hand truck which is its most usual application it is obvious that it may be applied to other types of vehicles.

I claim—

1. A truck, trolley or equivalent vehicle comprising a body having two side rails connected by transverse members and which body is mounted on wheels near the outer end of the body, a toe-piece or shoe for engaging a load to be placed on the vehicle which toe-piece or shoe in its inner position allows the body to be tilted into a vertical position and which is movably mounted on the body to be capable of projecting or passing from the outer end so that the load can be tilted over with the tilting over of the truck without being elevated or raised from the ground and so as to allow the turning axis of the truck to recede from the toe-piece or shoe during the tilting of the truck, depending flanges on the toe-piece or shoe with slots through which said transverse members pass for limiting the movement of the toe-piece or shoe in either direction, and means moving into and retaining the toe-piece or shoe in the inner position.

2. A truck, trolley or equivalent vehicle, comprising a body mounted on wheels near the outer end of the body, a toe-piece or shoe for engaging a load to be placed on the vehicle which toe-piece or shoe in its inner position allows the body to be tilted into a vertical position and which is movably mounted on the body to be capable of projecting or passing from the outer end so that the load can be tilted over with the tilting over of the truck without being elevated or raised from the ground and so as to allow the turning axis of the truck to recede from the toe-piece or shoe during the tilting of the truck, and means for preventing the wheels rotating in relation to the body when the body is moved for tilting the load.

In witness whereof I have signed this specification.

OLIVER JAMES WILLMOT.